(12) United States Patent
Brady et al.

(10) Patent No.: US 8,259,212 B2
(45) Date of Patent: Sep. 4, 2012

(54) MULTISCALE OPTICAL SYSTEM

(75) Inventors: David Jones Brady, Durham, NC (US);
Nathan Adrian Hagen, Durham, NC (US); Scott Thomas McCain, Durham, NC (US)

(73) Assignee: Applied Quantum Technologies, Inc., Durham, NC (US)

( * ) Notice: Subject to any disclaimer, the term of this patent is extended or adjusted under 35 U.S.C. 154(b) by 376 days.

(21) Appl. No.: 12/651,894

(22) Filed: Jan. 4, 2010

(65) Prior Publication Data
US 2010/0171866 A1    Jul. 8, 2010

Related U.S. Application Data

(60) Provisional application No. 61/142,499, filed on Jan. 5, 2009.

(51) Int. Cl.
*H04N 5/225* (2006.01)
*G02B 13/16* (2006.01)
*G02B 27/10* (2006.01)

(52) U.S. Cl. .................. 348/340; 348/335; 359/619

(58) Field of Classification Search .......... 348/335, 348/336, 340, 343, 344; 359/619–622, 624, 359/626, 628
See application file for complete search history.

(56) References Cited

U.S. PATENT DOCUMENTS

| | | | |
|---|---|---|---|
| 4,323,925 A | 4/1982 | Abell et al. | |
| 5,004,328 A | 4/1991 | Suzuki et al. | |
| 6,137,535 A | 10/2000 | Meyers | |
| 6,339,506 B1 | 1/2002 | Wakelin et al. | |
| 6,556,349 B2 | 4/2003 | Cox et al. | |
| 7,499,094 B2 * | 3/2009 | Kuriyama | 348/340 |
| 7,728,901 B2 * | 6/2010 | Onozawa et al. | 348/340 |
| 8,049,806 B2 * | 11/2011 | Feldman et al. | 348/340 |

(Continued)

FOREIGN PATENT DOCUMENTS
EP     0809124 A2    11/1997
(Continued)

OTHER PUBLICATIONS

Quertemont, Eric, "PCT Application No. PCT/US2011/034156 International Search Report Sep. 23, 2011", , Publisher: PCT, Published in: PCT.

(Continued)

*Primary Examiner* — Kelly L Jerabek
(74) *Attorney, Agent, or Firm* — Kaplan Breyer Schwartz & Ottesen LLP

(57) ABSTRACT

A means of enabling an imaging lens system that overcomes some of the costs and disadvantages of the prior art is disclosed. A lens system in accordance with the present invention reduces or eliminates one or more aberrations of an optical input by separating image collection functionality from image processing functionality. As a result, each function can be performed without compromising the other function. An embodiment of the present invention comprises a collection optic that provides a first optical field, based on light from a scene, to a processing optic that comprises a plurality of lenslets. The processing optic tiles the first optical field into a plurality of second optical fields. Each lenslet receives a different one of the plurality of second optical fields, reduces at least one localized aberration in its received second optical field, and provides the corrected optical field to a different one of plurality of photodetectors whose collective output is used to form a spatially correlated sub-image of that corrected optical field. The sub-images are readily combined into a spatially correlated image of the scene.

34 Claims, 7 Drawing Sheets

U.S. PATENT DOCUMENTS

| | | | |
|---|---|---|---|
| 2001/0026322 A1* | 10/2001 | Takahashi et al. | 348/340 |
| 2004/0061787 A1 | 4/2004 | Liu et al. | |
| 2004/0223071 A1* | 11/2004 | Wells et al. | 348/340 |
| 2004/0257460 A1* | 12/2004 | Kuriyama | 348/340 |
| 2005/0052751 A1 | 3/2005 | Liu et al. | |
| 2006/0055811 A1* | 3/2006 | Frtiz et al. | 348/340 |
| 2007/0109438 A1* | 5/2007 | Duparre et al. | 348/335 |
| 2007/0200946 A1* | 8/2007 | Onozawa et al. | 348/340 |
| 2007/0252074 A1 | 11/2007 | Ng et al. | |

FOREIGN PATENT DOCUMENTS

| | | |
|---|---|---|
| EP | 0893915 A2 | 1/1999 |
| WO | 9523349 A1 | 8/1995 |
| WO | 9926419 A1 | 5/1999 |

OTHER PUBLICATIONS

Hylla, Winfried, "PCT Application No. PCT/US2010/020077 International Preliminary Report on Patentability Mar. 31, 2011",, Publisher: PCT, Published in: PCT.

Lam, Edmund Y., "Compact and Thin Multi-lens System for Machine Vision Applications", "Image Processing: Machine Vision Applications", 2008, vol. 6813, Publisher: SPIE-IS&T Electronic Imaging.

Duparre et al., "Microoptical telescope compound eye", "Optics Express", Feb. 7, 2005, vol. 13, No. 3, Publisher: Optical Society of America, Published in: US.

Brady et al, "Multiscale lens design", "Optics Express 10659", Jun. 22, 2009, vol. 17, No. 13, Publisher: Optical Society of America, Published in: US.

Christensen et al., "Multiscale Optical Design for Global Chip-to-Chip Optical Interconnections and Misalignment Tolerant Packaging", "IEEE Journal on Selected Topics in Quantum Electronics", Mar./Apr. 2003, vol. 9, No. 2, Publisher: IEEE.

Duparre et al., "Thin compound-eye camera", "Applied Optics XP-002578598", 2005, vol. 44, No. 15, Publisher: Optical Society of America, Published in: US.

Hylla, Winfried, "PCT Application No. PCT/US2010/020077 International Search Report May 4, 2010",, Publisher: PCT, Published in: PCT.

* cited by examiner

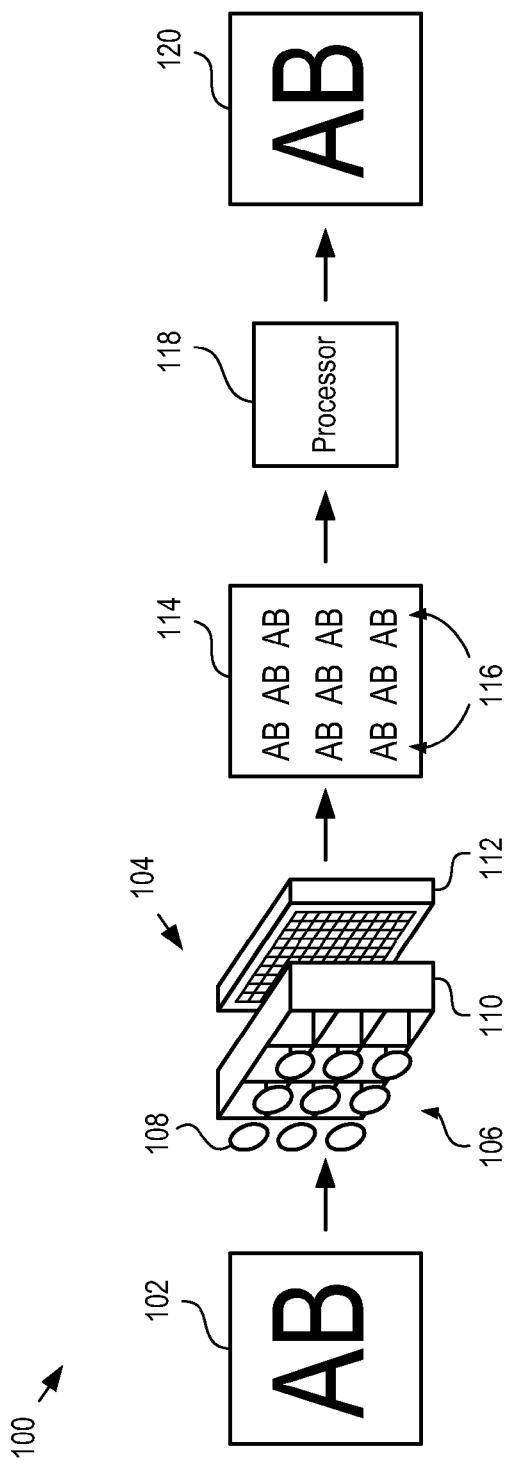
FIG. 1 (Prior Art)
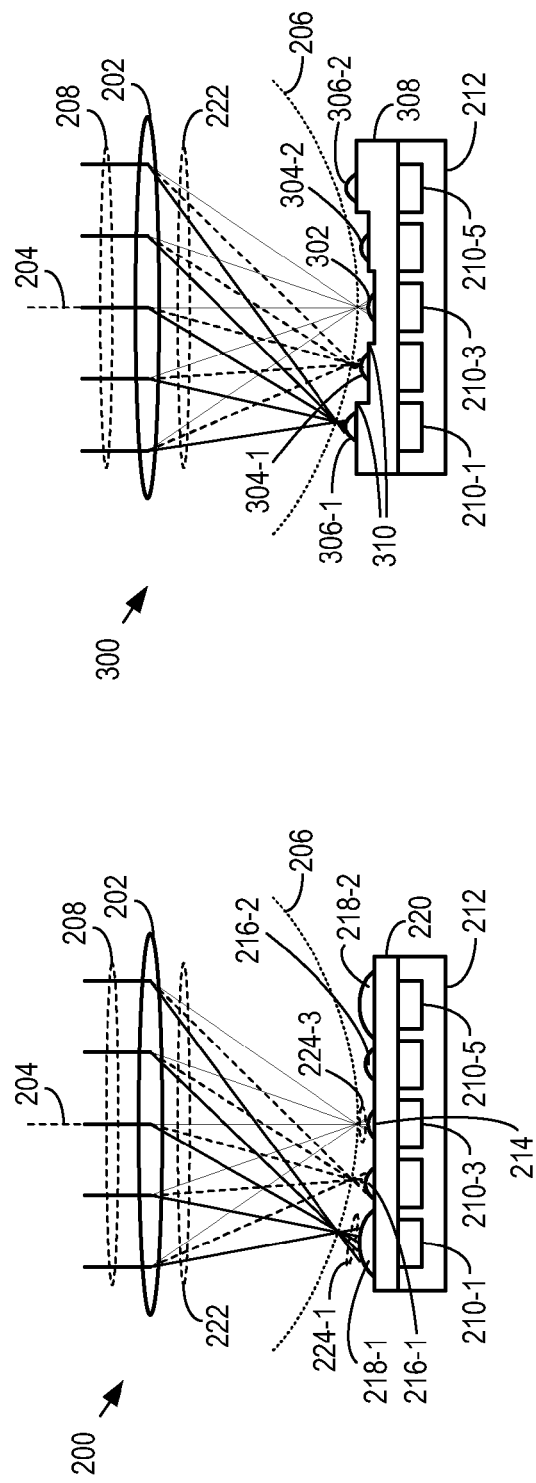
FIG. 3 (Prior Art)
FIG. 2 (Prior Art)

MULTISCALE OPTICAL SYSTEM

CROSS REFERENCE TO RELATED APPLICATIONS

This case claims priority of U.S. Provisional Patent Application U.S. 61/142,499, which was filed on Jan. 5, 2009, and which is incorporated herein by reference.

FIELD OF THE INVENTION

The present invention relates to imaging optics in general, and, more particularly, to imaging lenses.

BACKGROUND OF THE INVENTION

A trend in digital camera systems has been the shrinking of both optical elements and detector arrays. As these elements shrink, however, the optical performance of their optical systems suffer since the angular resolution and number of resolvable object points both decrease as the diameter of the imaging system is reduced.

A digital imaging system provides light from an object or scene to an opto-electronic detector array. Each detector provides an electrical signal whose magnitude is a function of the intensity of the light incident on that detector. As a result, the detector array enables the light to be electronically processed in order to estimate properties of the object. Typically, it is desirable for the lens system to (1) collect as much of the light signal as possible over as large an aperture as possible; and (2) process the collected light signal to either form an optical image on the detector array or to encode the light signal for digital image estimation.

Lens system design begins by specifying targets for major performance metrics, such as angular resolution, field-of-view, depth of field, spectral range, sensitivity, dynamic range, system mass and volume. Angular resolution is generally the most significant initial metric. The best angular resolution of a lens is given by $\lambda/A$, where $\lambda$ is the operating wavelength and A is the collection aperture diameter. Once the collection aperture size has been determined by this relationship, a lens is designed to achieve the remaining performance metrics by judicious choice of materials and surface profiles.

In conventional lens design, the aperture size of an entrance lens or optical stop (i.e., the primary aperture) often determines the effective aperture size of all subsequent lens surfaces (i.e., the secondary aperture) in the lens system. The use of multiple lenses and apertures enables a lens system to simultaneously: (1) create an effective focal length and magnification appropriate to the imaging task at hand; (2) reduce image aberrations; and (3) provide correct image orientation. Secondary apertures are typically matched to the effective cross section of the magnified or demagnified entrance aperture propagated through the lens system. In systems with low aberration, the size of the entrance aperture often determines angular resolution of the lens system while the size of the secondary apertures determines the field-of-view of the lens system.

Simple cameras typically balance field-of-view and resolution by using a sequence of lenses having approximately equally sized apertures. Microscopes, on the other hand, achieve large field-of-view and high angular resolution by increasing secondary aperture relative to the collection aperture. Telescopes achieve extra-ordinary angular resolution with a limited field-of-view by decreasing secondary aperture size. Wide-field cameras achieve large field-of-view by tolerating significant aberration across the image with approximately equal primary and secondary apertures. Conventional lens design, therefore, normally requires trade-offs between desired performance metrics. For example, telescopes achieve high angular resolution by sacrificing field-of-view, wide-field imagers achieve large angular fields-of-view by sacrificing diffraction-limited angular resolution, and compound-optics cameras achieve high quality by expanding system volume to include more aberration-correction optics.

In order to overcome some of the limitations of standard imaging optics, multi-aperture cameras have been developed. In multi-aperture systems, a standard camera objective lens is replaced by an array of lenslets, wherein each lenslet has a reduced focal length in comparison to a conventional camera. In such approaches, a detector measures a set of sub-sampled versions of the object within the field-of-view. Post-processing algorithms are used to generate a high-resolution image from the set of sub-sampled sub-images. The result is reduced system volume; however, the reduction in system volume is achieved at the cost of significant computational post-processing and compromised image quality.

In addition, the design space for multi-aperture cameras is severely restricted, which has limited their adoption in practical systems. The use of a multi-aperture camera requires that the size of its detector array and system aperture be approximately the same size. As a result, conventional multi-aperture designs are generally restricted to very small collection apertures. This also limits the number of camera formats that can be designed. Further, a multi-aperture camera typically has a restricted field-of-view due to a need to prevent the overlapping of sub-images on the detector array. Such overlapping can be avoided by introducing a field stop in the optical design; however, this increases system volume. Alternatively, absorbing barriers can be placed between the sub-image regions of the detector array; however, this significantly increases manufacturing cost and complexity.

A lens system that avoids some of the design trade-offs associated with conventional lens design and that achieves high performance cost-effectively is desirable.

SUMMARY OF THE INVENTION

The present invention enables optical systems that overcome some of the disadvantages of the prior art. The present invention enables a multi-scale lens system in which light collection and light processing functions are separate. As a result, each function can be independently designed without deleterious impact on the other function. The present invention enables lens systems that are characterized by one or more of the following: wide-field imaging with diffraction limited resolution; improved optical image resolution at higher light collection; lower cost lens systems; reduced system mass and volume; 3D imaging capability; improved depth-of-field; and lower cost detection systems. Embodiments of the present invention are particularly suitable for high-performance imaging systems for use in applications such as cell phones, cameras, surveillance systems, teleconferencing systems, satellite systems, and the like.

Prior-art lens systems achieve one performance metric, such as high-resolution, wide field-of-view, single-shot exposure, and form-factor, only by sacrificing at least one of the others. For example, conventional optical systems achieve high-resolution by sacrificing field-of-view through the use of a telescope configuration. In contrast, the present invention enables lens systems that achieve all of these performance metrics at the same time. Some embodiments of the present invention, for example, attain high resolution, wide field-of-view, single-shot exposure, all in a small form-factor.

The present invention enables optical imaging systems that combine single aperture lenses with large diameters and micro-optic, multi-aperture lens arrays. The single-aperture lens provides high angular resolution, while the micro-optic lenses provide aberration correction. Further, the use of multi-aperture lens arrays enables the use of segmented, high-density detector arrays.

Embodiments of the present invention comprise a processor optic that comprises a plurality of optical elements, such as lenslets. The processor optic tiles a first optical field, which is based on light from a scene, into a plurality of second optical fields. Some or all of the second optical fields are characterized by at least one localized aberration. Optical elements in the processing optic provide mitigation for localized aberrations. This relieves some or all of the need for the collector optic to provide correction for these aberrations.

Each of the optical elements provides a corrected optical field to a different one of a plurality of aperture arrays. In some embodiments, each aperture array comprises an array of photodetectors that receives one of the corrected optical fields. The output signals from each photodetector array are used to form a sub-image, spatially correlated with the scene. In some embodiments, these sub-images are combined to form a complete spatially correlated image of the scene.

In some embodiments, each aperture array is a second processing optic that comprises another plurality of optical elements. Each plurality of optical elements further tiles its received corrected optical field into a plurality of third optical fields. In some embodiments, each optical element also provides additional aberration correction for its third optical field. Such hierarchical embodiments enable the use of larger collector optics than single-stage embodiments of the present invention. In some embodiments, the optical properties of at least one lenslet are tunable.

Some embodiments comprise a mosaic of detector arrays, wherein each detector array provides an spatially correlated sub-image of a scene. In some of these embodiments, registration of these sub-images is done digitally. As a result, the alignment tolerances between the detector arrays are more relaxed than for prior-art systems.

An embodiment of the present invention comprises a method comprising: receiving a first portion of a first optical field at a first optical element, wherein the first portion is characterized by a first localized aberration, and wherein the first optical field is received from a collector optic that collects light from a scene; providing a second optical field from the first optical element, wherein the second optical field is based on the first portion, and wherein the magnitude of the first localized aberration in the second optical field is less than the magnitude of the first localized aberration in the first portion; receiving a second portion of the first optical field at a second optical element, wherein the second portion is characterized by a second localized aberration; and providing a third optical field from the second optical element, wherein the third optical field is based on the second portion, and wherein the magnitude of the second localized aberration in the third optical field is less than the magnitude of the second localized aberration in the second portion.

BRIEF DESCRIPTION OF THE DRAWINGS

FIG. 1 depicts a first imaging system in accordance with the prior art.

FIG. 2 depicts a second imaging system in accordance with the prior art.

FIG. 3 depicts a third imaging system in accordance with the prior art.

DETAILED DESCRIPTION

Figure 4:
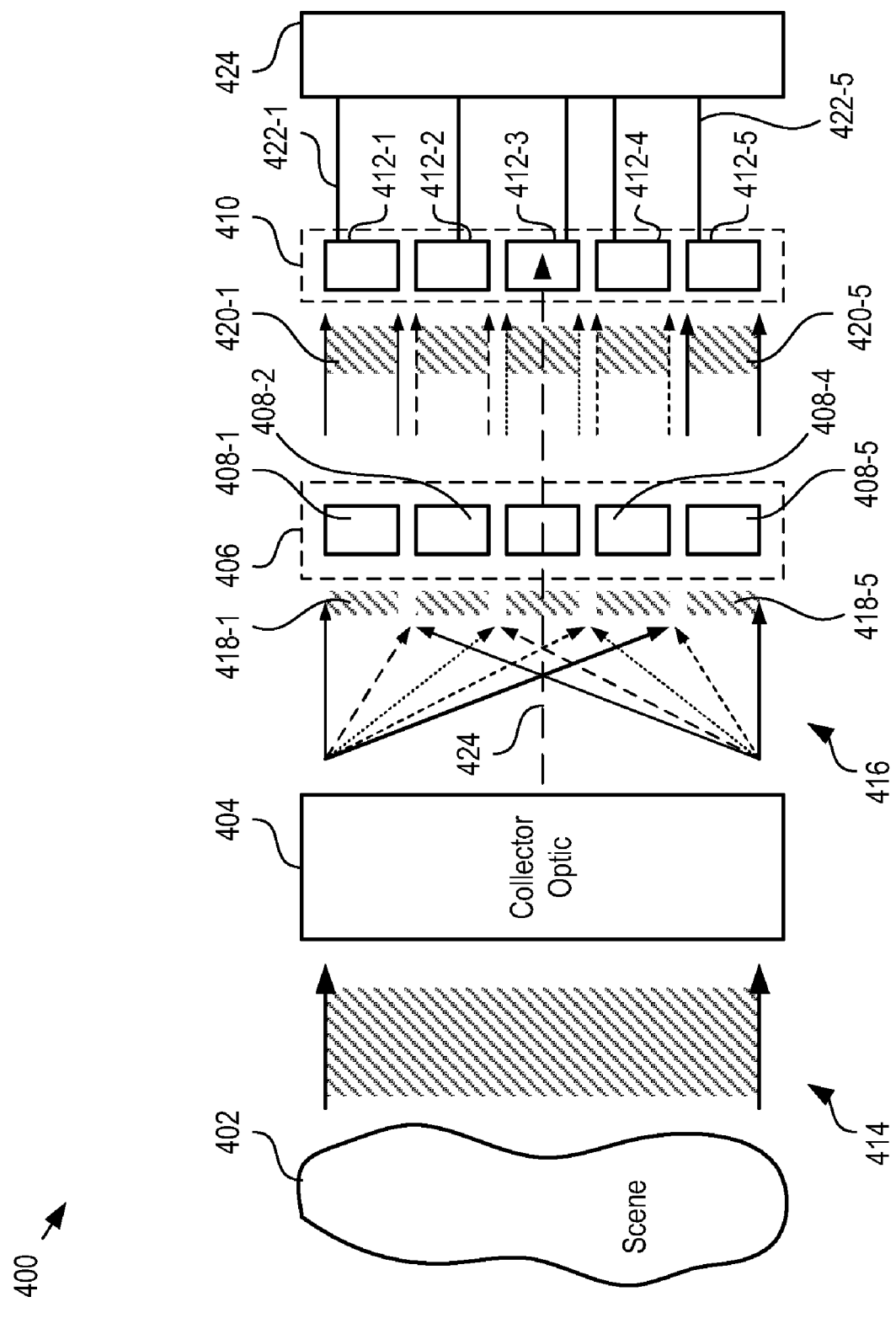
FIG. 4 depicts a schematic drawing of an imaging system in accordance with an illustrative embodiment of the present invention.

FIG. 1 depicts a first imaging system in accordance with the prior art. System 100 is an integrated computational imaging system that utilizes a multi-lens array and a reconstruction algorithm to provide high-resolution over a wide field-of-view. System 100 comprises imager 104, and processor 118.

Imager 104 is a Thin Observation Module by Bound Optics (TOMBO) imager that receives an optical field from scene 102. Imager 104 comprises lens array 106, separation layer 110, and photodetector array 112.

Lens array 106 comprises a two-dimensional array of substantially identical lenses 108. Each lens 108 in lens array 106 and its corresponding array of photodetectors forms a different imaging unit. Separation layer 110 comprises partitions that mitigate optical crosstalk between the imaging units.

In operation, imager 104 provides intermediate image 114. Intermediate image 114 comprises a plurality of images 116, each of which is a copy of a low-resolution image of scene 102 that is provided by a different imaging unit of imager 104. Images 116 are slightly distorted versions of each other, wherein the distortion is based on the position of its corresponding lens 108 within lens array 106.

Intermediate image 114 is received by processor 118. Processor 118 applies a reconstruction algorithm that converts the plurality of low-resolution images into a single high-resolution image 120. The quality of this reconstruction algorithm relies upon the accuracy of the parameter estimations for the displacement and aberrations in the optics of imager 104.

By providing the same information to each of different regions of a single photodetector array, a conventional TOMBO system enables the use of digital processing to overcome sampling limitations that result from the characteristics of the photodetector array itself. Unfortunately, a TOMBO system provides no improvement in the optical resolution of the image since it is ultimately limited by the aperture sizes of the individual lenslets, which are typically quite small.

Further, the design space for TOMBO-based imaging systems is extremely restricted. For example, the system aperture and detector array must be approximately the same size. As a result, such systems are typically restricted to small collection apertures. This also limits the number of available camera formats for which such a system can be designed. Further, the inclusion of separation layer 110 is typically necessary to restrict the field-of-view of a typical TOMBO-based system so as to prevent overlapping of images 116. This increase system volume substantially. Alternatively, light absorbing barriers can be used between the detector arrays associated with each lens 108; however, this increases the fabrication complexity and cost for the system.

FIG. 2 depicts a second imaging system in accordance with the prior art. System 200 is a two-stage imaging system that compensates for the curvature of field aberration. This aberration results from the projection of a spherically shaped image surface onto a plane. System 200 comprises lens 202, optoelectronic devices 210-1 through 210-5, and lenslets 214, 216-1, 216-2, 218-1, and 218-2. System 200 is symmetric about optical axis 204.

Lens 202 is a large-area lens that receives light 208 from a scene and provides optical field 222. Lens 202 is characterized by optical axis 204 and image surface 206. Lens 202 receives light 208 and focuses it at image surface 206. Image surface 206 is a spherically shaped surface that denotes the focal distance of lens 202.

Optoelectronic devices 210-1 through 210-5 (collectively referred to as devices 210) are formed in the top surface of substrate 212 and are co-planar.

Lenslets 214, 216-1, 216-2, 218-1, and 218-2 are lenslets, each of which receives one of optical fields 224-1 through 224-5 (collectively referred to as optical fields 224) from lens 202. For example, lenslet 218-1 receives optical field 224-1, lenslet 214 receives optical field 224-3, and lenslet 218-2 receives optical field 224-5 (not shown for clarity). Each lenslet focuses its received light field onto the face of its corresponding optoelectronic device 210.

Lenslets 214, 216-1, 216-2, 218-1, and 218-2 are also co-planar and are disposed on the top surface of spacer 220, which is disposed on substrate 212. Spacer 220 separates each of the lenslets from its respective device 210 by the focal distance of the lenslet.

Because the lenslets are coplanar, the separation distance between them and image surface 206 increases with distance from optical axis 204. As a result, the diameter of optical fields 224-1 and 224-5 received at lenslets 218-1 and 218-2 is larger than the diameter of the optical fields 224-2 and 224-4 received at lenslets 216-1 and 216-2, which are, in turn, larger than optical field 224-3 received at lenslet 214. In order to accommodate the larger size of the optical fields they receive, lenslets 216-1 and 216-2 are larger (i.e., have a larger clear aperture) than lenslet 214. In similar fashion, lenslets 218-1 and 218-2 are larger than lenslets 216-1 and 216-2. Further, the focal lengths of the lenslets increase with increasing distance from optical axis 204 to accommodate the increasing separation from image surface 206.

It should be noted that system 200 provides a degree of compensation for field curvature, which is a global aberration. For the purpose of this Specification, including the appended claims, a "global aberration" is defined as an aberration that extends, in slowly varying fashion, across multiple optical fields. A "localized aberration" is defined as an aberration, or a portion of a global aberration, that is substantially unique to an individual optical field. For example, a plurality of localized aberrations might collectively define a global aberration; however, the magnitude of wavefront distortion associated with each localized aberration is substantially unique to its associated individual optical field. In order to correct a localized aberration, therefore, an individual lenslet requires a prescription unique to its received optical field.

Lenslets 214, 216-1, 216-2, 218-1, and 218-2 are substantially identical. As a result, system 200 does not correct for localized aberrations. For example, optical field 222 can be characterized by a global aberration that is substantially a slowly varying function across the collective optical fields 224. Each of optical fields 224 can be characterized by one or more localized aberrations that are associated only with that specific optical field.

An additional disadvantage associated with system 200 arises in cases wherein the diameter of some of the lenslets approaches or exceeds the pitch of optoelectronic devices 510.

FIG. 3 depicts a third imaging system in accordance with the prior art. System 300 is a second two-stage imaging system that compensates for the curvature of field aberration. System 300 comprises lens 202, optoelectronic devices 210-1 through 210-5, and lenslets 302, 304-1, 304-2, 306-1, and 306-2.

Lenslets 302, 304-1, 304-2, 306-1, and 306-2 are disposed on the top surface of spacer 308. Spacer 308 comprises steps 310, which enable each of the lenslets to be located at image surface 206. As a result, however, spacer 208 separates each of the lenslets from its respective device 210 by a distance that increases with distance from optical axis 204. Each of the lenslets, therefore, has a focal length that corresponds to its separation distance between it and its corresponding optoelectronic device 210.

Since system 300 positions each lenslet close to image surface 206, the light fields received by the lenslets comprise more of the light focuses at image surface 206 by lens 202. As a result, each of the lenslets can have substantially the same diameter; however the curvature of the lenslets increases with distance from optical axis 204.

In should be noted that each of systems 200 and 300 employ a single optoelectronic element 210 per lenslet.

Lenslets 302, 304-1, 304-2, 306-1, and 306-2 are substantially identical except for their differences in focal length. In similar fashion to system 200, therefore, system 300 only provides a degree of compensation for field curvature.

Multi-scale Imaging

The present invention relies on an inventive concept referred to as "multi-scale imaging." In contrast to prior-art imaging systems, such as those depicted in FIGS. 1-3, embodiments of the present invention comprise a multi-aperture processing optic (e.g., an array of lenslets) that interposes a collector lens and a focal plane, wherein each aperture in the processing optic provides wavefront correction that mitigates localized aberrations within an optical field it receives from the collector lens. This use of a heterogeneous array of processing apertures to correct localized aberrations represents a significant difference between embodiments of the present invention and multiple aperture imaging systems of the prior art.

The multi-scale imaging approach affords embodiments of the present invention significant advantages over prior-art imaging systems. First, the present invention separates light collection from much of the light processing. This separation enables each of the collecting and processing functions to be individually improved without comprising the design of the other. It also enables a large-scale collector lens to be used with a large-count multi-aperture array, thereby reducing the trade-off between geometric aberration and field-of-view.

Second, the correction of localized aberrations reduces the design complexity required for the collector lens. This enables faster collection optics, which reduces overall system volume.

Third, embodiments of the present invention are capable of improved image resolution.

Fourth, manufacturing cost and complexity are significantly lower for embodiments of the present invention. Smaller lenses are better at providing wavefront correction because: 1) wavefront correction and image formation both yield geometric solutions with less wavelength-scale error over smaller apertures; and 2) manufacturing of complex lens surfaces is much easier in smaller scale systems.

Fifth, in some embodiments of the present invention, the processor optics focus at diverse ranges with overlapping fields. This enables tomographic object reconstruction by combining multi-scale imaging with multi-dimensional image capture, such as, for example, in a TOMBO-based system.

Finally, multi-scale design enables the use of multiple discrete focal plane arrays. As a result, the discrete focal plane arrays can be arranged in any advantageous manner, including non-planar arrangements. Further, the size of the focal plane arrays can be selected at a granularity that reduces fabrication cost and increases overall reliability. Still further, the sub-images from the plurality of focal plane arrays can be collectively synthesized into a spatially correlated image of a scene without the stitching and field uniformity issues found in prior-art imaging systems. And still further, the complexity of the post-processing required to synthesize the full-scene image is significantly lower for embodiments of the present invention than the computational post-processing required in prior-art imaging systems, such as a TOMBO-based system.

FIG. 4 depicts a schematic drawing of an imaging system in accordance with an illustrative embodiment of the present invention. System 400 comprises collector optic 404, processor optic 406, and aperture array 410.

Figure 5:
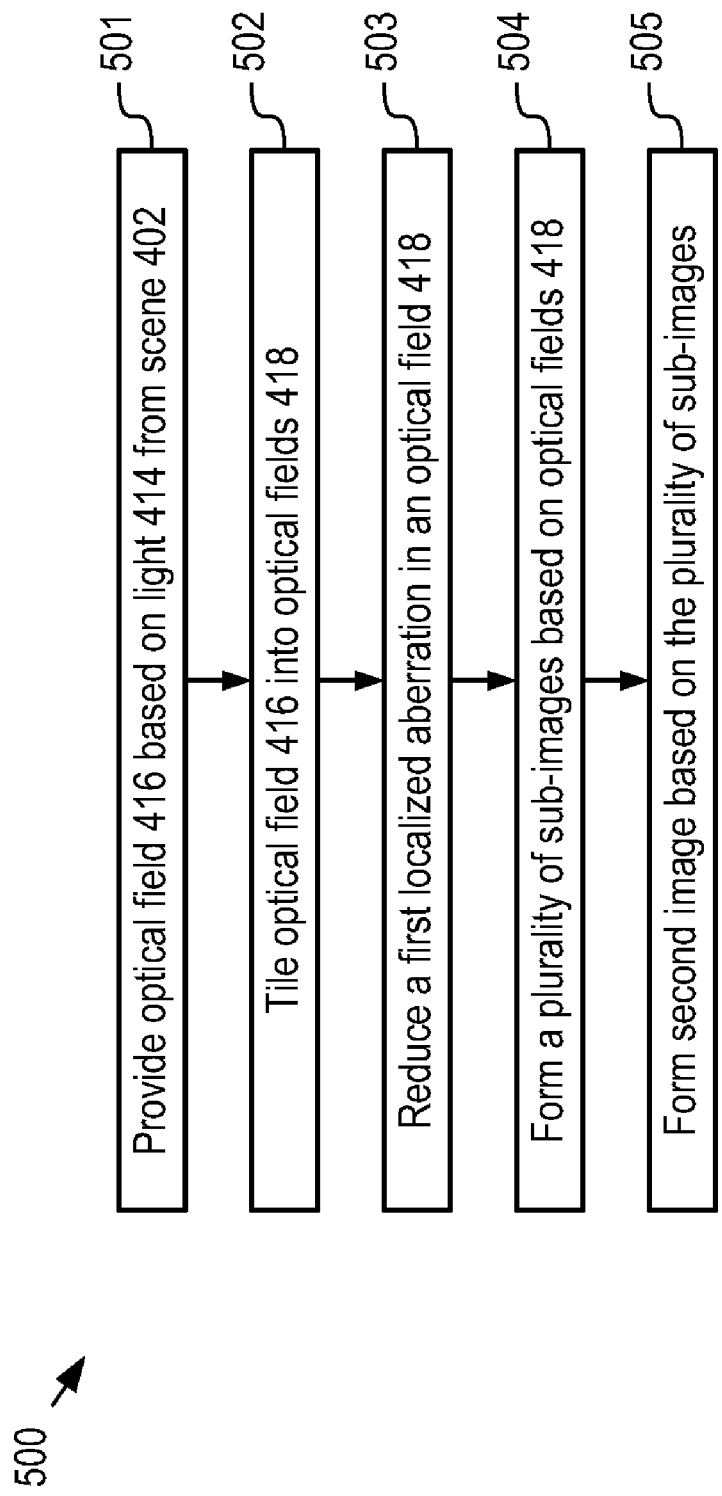
FIG. 5 depicts operations of a method suitable for providing an image in accordance with the illustrative embodiment of the present invention.

FIG. 5 depicts operations of a method suitable for providing an image in accordance with the illustrative embodiment of the present invention. Method 500 begins with operation 501, wherein light 414 from scene 402 is collected by collector optic 404 and provided to processor optic 406 as optical field 416.

Collector optic 404 is a large aperture lens. Collector optic 404 is analogous to lens 202 described above and with respect to FIG. 2.

At operation 502, optical field 416 is tiled into optical fields 418-1, 418-2, 418-3, 418-4, and 418-5. In order to tile optical field 416, collector optic 404 provides it to processor optic 406 such that a different portion of optical field 416 (i.e., each of optical fields 418-1, 418-2, 418-3, 418-4, and 418-5) is received at the clear aperture of each optical element 408-1 through 408-5 of processor optic 406. Optical fields 418-1, 418-2, 418-3, 418-4, and 418-5 (collectively referred to as optical fields 418) are received by lenslets 408-1, 408-2, 408-3, 408-4, and 408-5 (collectively referred to as lenslets 408), respectively. In some embodiments, collector optic 404 provides some correction of one or more global aberrations of optical field 416.

Processor optic 406 is an array of lenslets located at a point after the image plane of collector optic 404. Processor optic 406 comprises lenslets 408-1, 408-2, 408-3, 408-4, and 408-5. Processor optic 406 receives optical field 416 and, among other things, tiles optical field 416 into an array of smaller optical fields 418-1 through 418-5. In some embodiments, processor optic 406 comprises optical elements other than lenslets, such as prisms, diffraction gratings, filters, and the like.

Although system 400 comprises lenslets 408 that are located after the image plane of collector optic 404, it will be clear to one skilled in the art, after reading this specification, how to specify, make, and use alternative embodiments of the present invention wherein lenslets 408 are located prior to the image plane of collector optic 404.

As discussed above, the tiling of optical field 416 into a plurality of distinct regions (i.e., optical fields 418-1 through 418-5) enables image formation and processing to be done primarily by lenslets 408. As a result, the present invention substantially reduces or eliminates the need for the design tradeoffs, such as angular resolution vs. field-of-view, resolution vs. system volume, etc., that are inherent to the design of large lenses.

Importantly, the tiling of optical field 416 into a plurality of distinct optical fields 418-1 through 418-5 also enables the use of individual prescriptions for each lenslet 408 to correct localized aberrations centered on its respective field angle. In other words, each individual lenslet can be designed with a prescription suitable for correction of one or more localized aberrations within its received optical field 418.

At operation 503, processor optic reduces localized aberrations in some of optical fields 418. In some embodiments, each of lenslet 408 is designed to improve localized:

i. spherical aberration; or ii. coma; or iii. astigmatism; or iv. field curvature; or v. distortion; or vi. uniform defocus; or vii. linear defocus; or viii. quadratic defocus; or ix. any combination of i, ii, iii, iv, v, vi, vii, and viii.

In order to provide correction for localized aberrations, each of lenslets 408 is characterized by an individualized prescription based on those localized aberrations. In some embodiments, one or more localized aberration is based on the geographic position of optical field 418 within optical field 416, and the prescription of each of lenslets 408 is based upon its geographic position within processor optic 406.

The prescription for each of lenslets 408 can be defined by first-order design principles. The Seidel aberrations (i.e., spherical aberrations, coma, astigmatism, field curvature, and distortion) for optical field 416 are based on the use of a simple thin lens for collector optic 404 and an idealized lens at the location of processor optic 406. The aberration function of the image at aperture array 410 is then determined by:

$$W(H,\rho,\phi)=W_{040}\rho^4+W_{131}H\rho^3\cos\phi+W_{222}H^2\rho^2\cos^2\phi+W_{220}H^2\rho^2\cos^2\phi+W_{311}H^2\rho\cos\phi, \quad (1)$$

where $W_{ijk}$ is the wavefront aberration coefficient expressed in units of length, H is the normalized field angle, $\rho$ is the normalized pupil radius, and $\phi$ is the azimuth angle of the pupil coordinate.

The prescription for each lenslet 408 can be developed by first expanding the expression for wavefront aberration from equation (1) above in terms of the central field angle, $H_n$, for the nth lenslet as follows:

$$W(H - H_{n,\rho,\phi}) = W_{040}\rho^4 + W_{131}(H - H_n)\rho\cos\phi + W_{222}(H - H_n)^2\rho^2\cos^2\phi + W_{220}(H - H_n)^2\cos^2\phi$$

$$= \underbrace{[W_{040}\rho^4]}_{SA} +$$

$$\left[\underbrace{W_{131}H\rho^3\cos\phi}_{\text{linear coma}} + \underbrace{W_{131}H_n\rho^3\cos\phi}_{\text{constant coma}}\right] +$$

$$\left[\underbrace{W_{222}H^2\rho^2\cos^2\phi}_{\text{quadratic astigmatism}} + \underbrace{2W_{222}HH_n\rho^2\cos^2\phi}_{\text{linear astigmatism}} + \underbrace{W_{222}H_n^2\rho^2\cos^2\phi}_{\text{constant astigmatism}}\right] +$$

$$\left[\underbrace{W_{220}H^2\rho^2}_{\text{quadratic defocus (i.e. FC)}} - \underbrace{2W_{220}HH_n\rho^2}_{\text{linear defocus}} + \underbrace{W_{220}H_n^2\rho^2}_{\text{defocus}}\right] +$$

$$\left[\underbrace{W_{311}H^3\rho\cos\phi}_{\text{cubic distortion}} - \underbrace{3W_{311}H^2H_n\rho\cos\phi}_{\text{quadratic distortion}} + \underbrace{3W_{311}HH_n^2\rho\cos\phi}_{\text{tilt (i.e. magnification error)}} - \underbrace{W_{311}H_n^2\rho\cos\phi}_{\text{field displacement}}\right]$$

The expression of the aberration function localized about the central field angle of a given lenslet produces a number of aberration terms which are not of Seidel form. Beneficially, however, the aberrations with high-order field dependence are significantly reduced and much of their wavefront error is shifted into lower-order terms. Advantageously, these lower-order terms are easier to correct optically using an appropriate prescription for each lenslet. The inclusion of non-Seidel aberrations, however, requires that the surfaces of the lenslet comprises non-cylindrically-symmetric shapes in order to provide suitable aberration correction.

Example of Full-field Curvature Correction

In order to demonstrate how the inclusion of non-cylindrically-symmetric shapes in a lenslet can provide correction for localized aberrations, an exemplary correction for full-field curvature is provided here.

Figure 6:
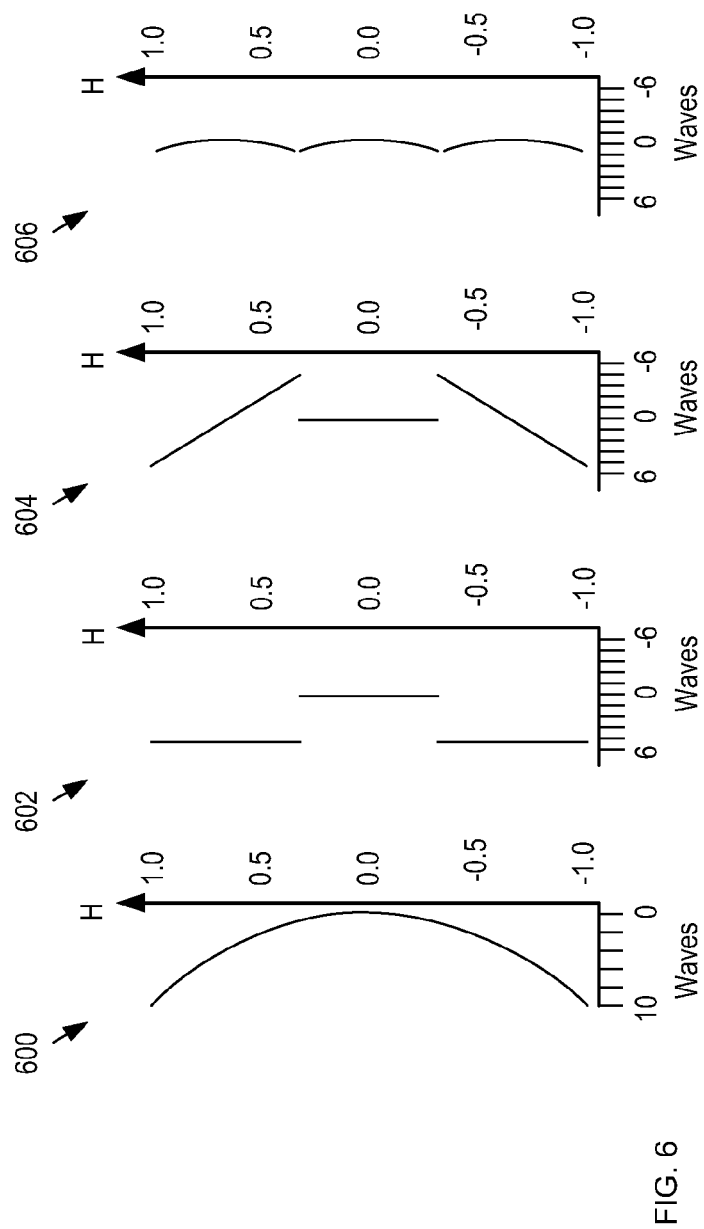
FIG. 6 depicts a representation of the decomposition of full-field field curvature into more-readily correctable component aberrations.

FIG. 6 depicts a representation of the decomposition of full-field field curvature into more-readily correctable component aberrations. Plot 600 depicts the full-field field curvature of optical field 416 at a processor optic that comprises three optical elements. From plots 602, 604, and 606, an estimation of the localized aberrations at each optical element can be developed. As seen from plot 602, the two off-axis optical elements see a uniform defocus of approximately 4 to 4.5 waves. Plot 604 evinces that each off-axis optical element also sees a significant linear variation in defocus. Finally, plot 606 depicts the conventional field curvature, which is very small, at each optical element.

It is clear from plots 602, 604, and 606 that by splitting optical field 416 into optical fields 408, the primary aberrations for off-axis lenslets 408-1, 408-2, 408-4, and 408-5 become uniform defocus and linear defocus (i.e., image tilt).

Figure 7:
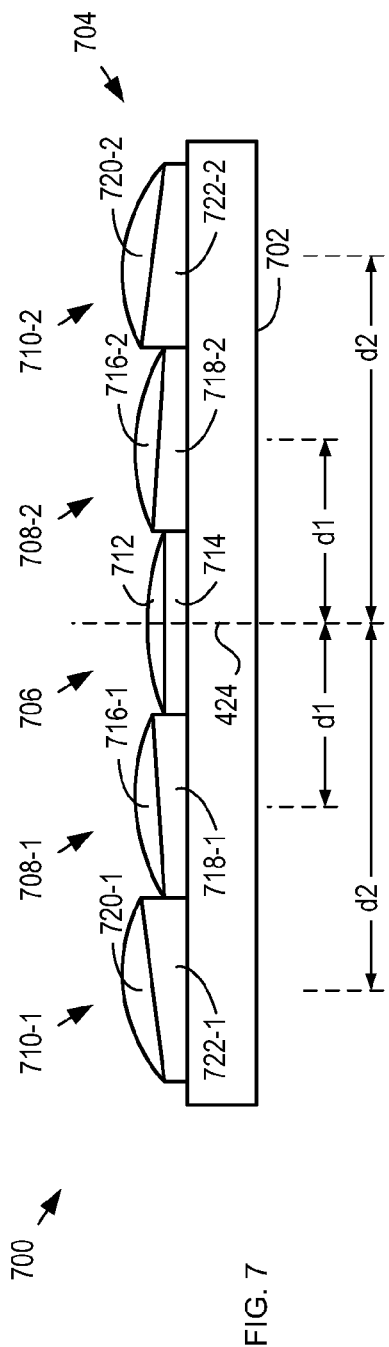
FIG. 7 depicts a cross-sectional view of a processor optic suitable for correcting full-field curvature.

FIG. 7 depicts a cross-sectional view of a processor optic suitable for correcting full-field curvature. Processor optic 700 comprises substrate 702 and lenslets 706, 708-1, 708-2, 710-1, and 710-2.

Substrate 702 is a glass substrate having a thickness sufficient to provide mechanical strength. Substrate 702 is also sufficiently thick to enable the formation of lenslets 706, 708-1, 708-2, 710-1, and 710-2 in surface 704. In some embodiments, substrate 702 comprises a material other than glass. Suitable materials for use in substrate 702 include, without limitation, plastics, semiconductors, doped glasses, dielectrics, and the like. In some embodiments, substrate 702 comprises a material suitable for forming lenses that operate at wavelength ranges other than visible, such as ultraviolet, near infrared, mid-infrared, long infrared, and the like.

Lenslets 706, 708-1, 708-2, 710-1, and 710-2 are formed in surface 704 using reactive ion etching and sacrificial resist techniques. In some embodiments, the lenslets are formed using molding techniques, embossing, or another conventional technique. It will be clear to one skilled in the art, after reading this specification, how to specify, make, and use lenslets 706, 708-1, 708-2, 710-1, and 710-2. In some embodiments, lenslets 706, 708-1, 708-2, 710-1, and 710-2 are characterized by complex surface shapes formed on different substrates, which are aligned and stacked together to form composite lenslets.

In some embodiments comprise lenslets having optical properties that are tunable. Lenslet tunability can be affected through any suitable means including, without limitation, electrical, mechanical, thermal, magnetic, micro-electro-mechanical, electromagnetic, magnetostrictive, and the like. Optical properties that can be tuned include, without limitation, magnification, focal length, change of focal plane, and the like.

Lenslet 706 comprises lens 712, which is a spherically symmetric lens suitable for imaging a received optical field at a corresponding detector array. The focal length of lens 712 is based on the combined thickness of substrate 702 and slab 714, which typically defines the separation between lens 712 and its corresponding detector array.

Lenslet 706 is centered on optical axis 424. As a result, lenslet 706 requires no correction for linear defocus. Slab 714, therefore, is substantially rectangular in shape.

Lenslets 708-1 and 708-2 are each separated from optical axis 424 by distance d1. As depicted in plots 602 and 604, the optical fields received by these lenslets exhibit both uniform defocus and linear defocus.

Linear defocus is a function of lenslet position, however. As the distance from optical axis 424 increases, the amount of linear defocus correction required increases commensurately. Linear defocus is corrected by incorporating prisms 718-1 and 718-2 into lenslets 716-1 and 716-2, respectively. The wedge shape of prisms 718-1 and 718-2 correct for linear defocus by "untilting" their respective images. The angle of the wedge shape is dictated by the amount of image tilt correction required at each lenslet, which is based on distance d1. After correction of uniform and linear defocus, field curvature aberration remains; however, it is greatly reduced from its full-field form.

Uniform defocus is readily corrected by changing the focal length of each lenslet to compensate for the defocus at that lenslet. As a result, the focal length of lenslets 716-1 and 716-2 is based on distance d1 and the thickness of prisms 718-1 and 718-2.

In similar fashion, lenslets 710-1 and 710-2 are each separated from optical axis 424 by distance d2. As a result, the optical fields received by these lenslets exhibit greater uniform defocus and linear defocus. Lenslets 710-1 and 710-2, therefore, comprise prisms 722-1 and 722-2, which have larger wedge angles than prisms 718-1 and 718-2. Further, the focal length of lenslets 720-1 and 720-2 is based on distance d2 and the thickness of prisms 722-1 and 722-2.

The example above demonstrates correction for substantially linear aberrations of uniform and linear defocus. In order to suppress other aberrations, such as coma, spherical aberration, astigmatism, distortion, and the like, a more complicated lenslet design is typically required. Such designs can be readily accomplished using numerical methods and computational lens design techniques.

Figure 8:
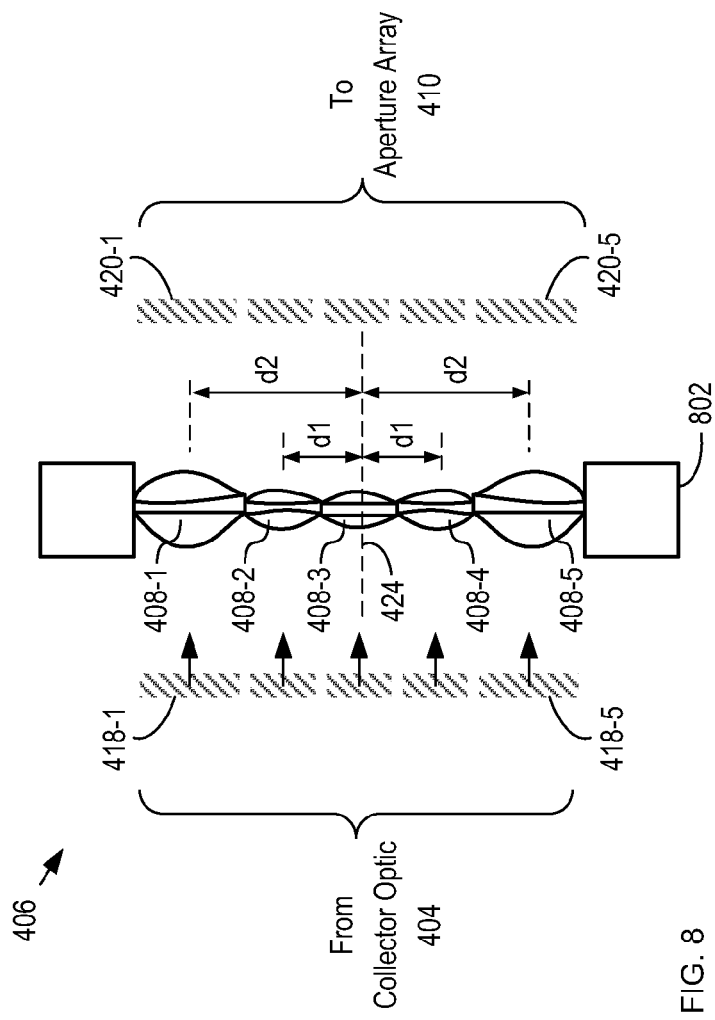
FIG. 8 depicts a schematic diagram of a processor optic in accordance with the illustrative embodiment of the present invention.

FIG. 8 depicts a schematic diagram of a processor optic in accordance with the illustrative embodiment of the present invention. Processor optic 406 comprises lenslets 408-1 through 408-5 and frame 802. Processor optic 406 is analogous to processor optic 700 described above, and with respect to FIG. 7. As such, lenslets 408 and frame 802 are formed using the materials and methods described above, vis-à-vis substrate 702 and lenslets 706, 708-1, 708-2, 710-1, and 710-2.

Frame 802 is an unaltered portion of a substrate. Frame 802 provides mechanical strength and stability to processor optic 406. Frame 802 also provides a convenient mounting surface for processor optic 406.

Lenslet 408-3 is centered on optical axis 424; therefore, lenslet 408-3 is axially symmetric.

Lenslets 408-1, 408-2, 408-4, and 408-5 are off-axis lenslets and, therefore, incorporate "wedge-like" features, as shown. Further, each of lenslets 408-1, 408-2, 408-4, and 408-5 comprises a surface having a shape for mitigating an aberration other than uniform defocus and linear defocus. In some embodiments, each of lenslets 408-1, 408-2, 408-4, and 408-5 comprises a complex surface for mitigating an additional localized aberration. By segmenting the processing aperture into sub-apertures, diverse localized aberrations may be independently corrected in received optical field 418. FIG. 8 depicts aberration correction that is stronger in optical elements 408-1 and 408-5. The increased aberration correction accommodates for the failure of small angle approximations for lenslets located at the edges of the image field. The design anticipates aspheric optical elements for complex wavefront correction at off-axis field points and diversity in forms for lenslets for diverse field points.

Each localized aberration of an individual optical field 418 is characterized by a magnitude of wavefront distortion. Wavefront correction capability is proportional to lens aperture size, since wavefront correction capability is based on the maximum phase delay achievable between two points on the lens. As a result, there exists a relationship between the magnitude of wavefront distortion for a localized aberration and the aperture size necessary for correcting that localized aberration. In some embodiments, therefore, the size of each of lenslets 408 is individually determined based on the magnitude of the wavefront distortion associated with one or more localized aberrations of its received optical field 418. In some embodiments, the manner in which optical field 416 is tiled into optical fields 418 is determined by the manner in which the magnitude of wavefront distortion varies across optical field 416. In other words, the arrangement of lenslets 408, as well as the size of each of the lenslets, is based on how effectively correction of wavefront distortion can be achieved over each portion of optical field 416.

The inventors of the present invention recognized that the optimal aperture size for each of lenslets 408 is the largest aperture over which nearly diffraction limited imaging can be achieved, given the practical constraints associated with lens manufacturing and integration. For current lens manufacturing, aperture size for lenslets 408 within the range of approximately 100 to approximately 1000 times the wavelengths of light in its associated optical field 418.

Figure 9:
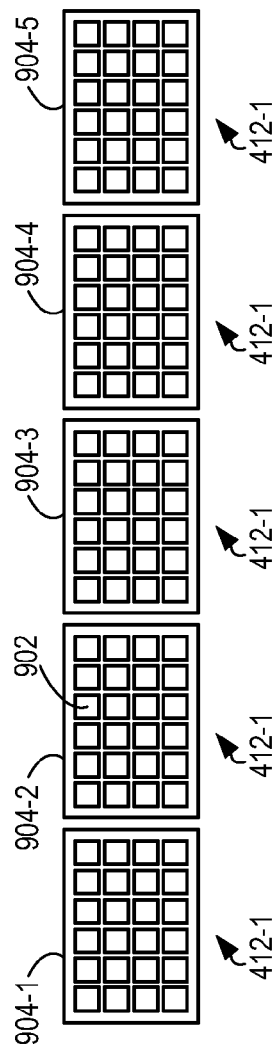
FIG. 9 depicts a schematic diagram of an aperture array in accordance with the illustrative embodiment of the present invention.

FIG. 9 depicts a schematic diagram of an aperture array in accordance with the illustrative embodiment of the present invention. Aperture array 410 comprises detector arrays 412-1 through 412-5 (collectively referred to as detector arrays 412). Each detector array 412 comprises a two-dimensional arrangement of photodetectors 902, which are disposed on the surface of a substrate 904. For example, detector array 412-3 comprises a 6×3 two-dimensional array of photodetectors 902 that are formed on a surface of substrate 904-3. The size of each detector array 412 is based upon the aperture size of its corresponding lenslet 408, which is based, in turn, upon the degree of aberration correction the lenslet provides, as discussed above and with respect to FIG. 8. In some embodiments, at least one of detector array 412 is a different size and/or comprises a different number of photodetectors 902 than at least one other detector array 412. In some embodiments, detector arrays 412 are monolithically integrated on a single substrate. In some embodiments, detector arrays 412 are co-planar.

At operation 504, optical fields 418-1 through 418-5 are received by processor optic 406. Each lenslet 408 of processor optic 406 images its received optical field onto aperture array 410 as one of individual optical fields 420-1, 420-2, 420-3, 420-4, and 420-5 (collectively referred to as optical fields 420). For example, lenslets 408-2 and 408-5 image optical fields 418-2 and 418-5 onto apertures 412-2 and 412-5 as tiled optical fields 420-2 and 420-5 of scene 402. Collectively, optical fields 420 represent a complete, spatially correlated image of scene 402.

Each lenslet 408 and its corresponding detector array 412 collectively define a different one of a plurality of sub-imaging units. These sub-imaging units sub-divide optical field 416 into a plurality of mosaicked sub-images. Mosaicking of the sub-images affords embodiments of the present invention with several advantages over imaging systems of the prior art. First, it enables overlapping fields-of-view to be used, which relieves a significant constraint for prior-art imaging systems wherein the focal plane array that receives an image of a scene must comprise photodetectors that are immediately adjacent to one another. As a result, each of detector arrays 412 can be sized to optimize cost, yield, etc. It also enables the use of detector arrays that are different sizes, if desired. Second, detector arrays 412 can be spaced to allow for the inclusion of electronics between them. Third, Mosaicking of the sub-images enables multiple-aperture cameras that jointly optimize physical filtering, sampling, and digital processing of the resultant images.

Each of detector arrays 412-1 through 412-5 provides an electrical signal from each of its photodetectors 902 to processor 424. These electrical signals are provided as electrical signal arrays 422-1 through 422-5 (collectively referred to as electrical signal arrays 422). For example, detector array 412-1 provides electrical signal array 422-1, which is based on optical field 420-1, to processor 424.

At operation 505, processor 424 forms a composite image of scene 402 based on electrical signal arrays 422, which are based on optical fields 420.

Processor 424 is a general purpose processor that receives electrical signal arrays 422. Processor 424 digitally processes electrical signal arrays 422-1 through 422-5 to develop sub-images representative of optical fields 420-1 through 420-5, respectively. Processor 424 stitches these sub-images into a composite image that represents scene 402.

In some embodiments, the magnification factor of lenslets 408 is less than 1; therefore, optical fields 420 are separated from one another are substantially independent of one another. As a result, packaging tolerances for detector arrays 412 can be quite relaxed as compared to typical requirements for prior art imaging systems. For example, detector arrays in accordance with the present invention can be physically displaced from one another, include conditioning electronics between arrays, and the like. As a result, the present invention enables a significant manufacturing cost reduction compared to the prior art.

Figure 10:
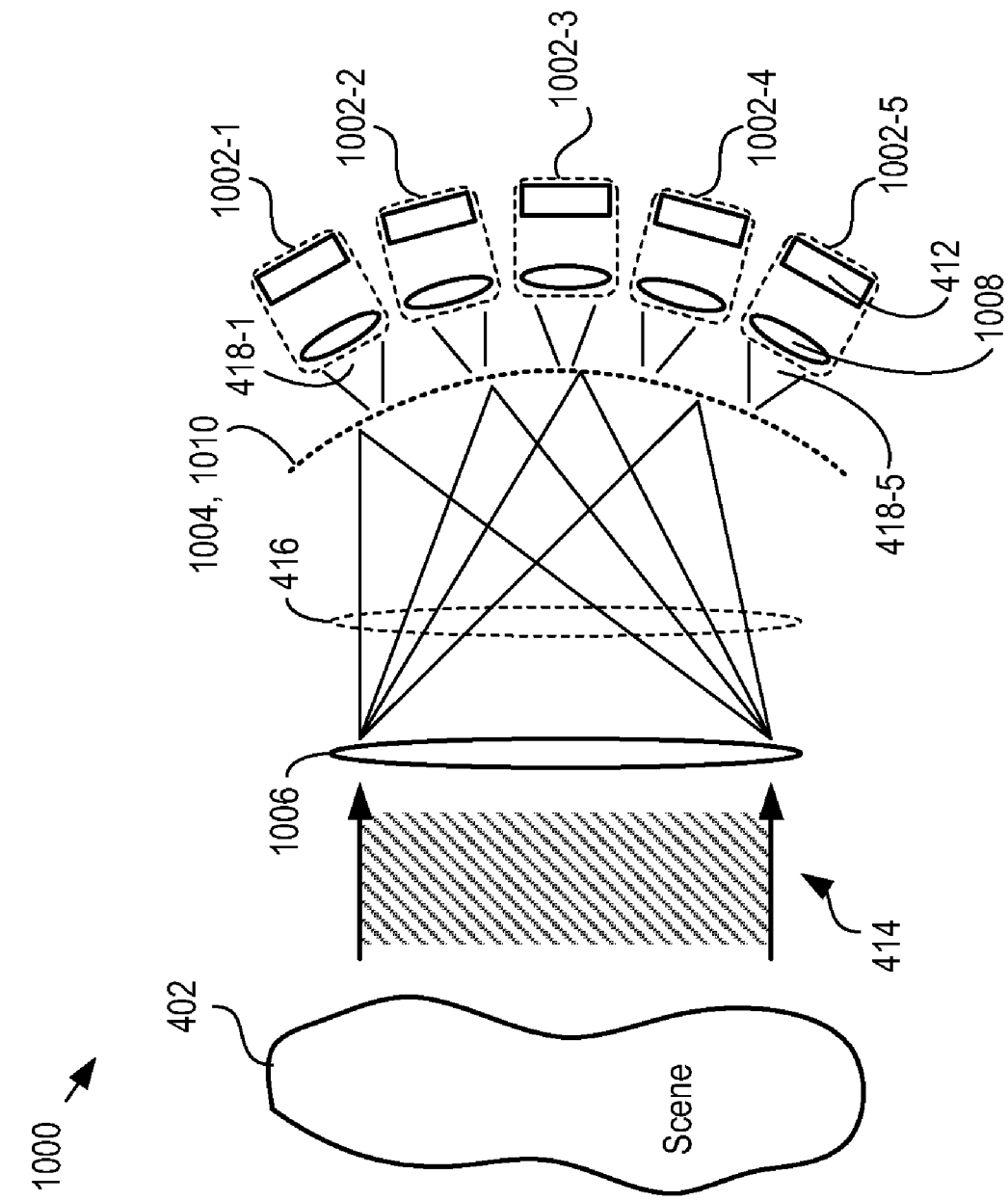
FIG. 10 depicts a schematic diagram of an imaging system in accordance with a first alternative embodiment of the present invention.

FIG. 10 depicts a schematic diagram of an imaging system in accordance with a first alternative embodiment of the present invention. System 1000 comprises sub-imaging units 1002-1 through 1002-5, and collector optic 1006.

Collector optic 1006 forms image 1010 of scene 402 at image field 1004. Collector optic 1006 is analogous to collector optic 404.

Sub-imaging units 1002-1 through 1002-5 (collectively referred to as sub-imaging units 1002) are arranged in an arrangement that substantially matches the shape of image field 1004. Each of sub-imaging units 1002 comprises one lenslet 1008 and one detector array 412.

Each of lenslets 1008 is a substantially identical lenslet that relays a portion of image 1010 onto its corresponding detector array 412. In other words, lenslets 1008 act as relay lenses that collectively relay the image formed by collector optic 1006 at image field 1004. In system 1000, each of lenslets 1008 demagnifies its received image portion onto its corresponding photodetector array 412. Demagnification of each received image portion mitigates the potential for loss of image information at segmented photodetector arrays 1102. In some embodiments, each of lenslets 1008 magnifies its received image portion while relaying it onto its respective photodetector array. In some embodiments, lenslets 1008 do not magnify or demagnify their received image portions. It should be noted that, as described above, in some embodiments, each individual lenslet 1008 within sub-imaging units 1002 comprises features that mitigate localized aberrations in its received optical field 418, such as is described above and with respect to FIGS. 4-9.

The fact that detector arrays can be mosaicked, as described above, enables several advantages for system 1000 as compared to other imaging systems. First, sub-imagining units 1002 are substantially identical and can, therefore, be readily mass manufactured at relatively low cost.

Second, an additional lens, whose prescription is uniquely based on the sub-imaging units position in system 1000, can be easily added to each of otherwise identical sub-imaging units 1002. Such arrangements separate the image relay aberration correction functions of lenslets 1008. As a result, such systems can be manufactured at low cost yet still provide correction of localized aberration correction.

Third, sub-imaging units 1002 can be arranged in any practical arrangement that exploits the optical system, such as the curved arrangement depicted in FIG. 10. Although system 1000 is depicted as comprising a one-dimensional arrangement of sub-imaging units 1002, it will be clear to one skilled in the art, after reading this specification, how to specify, make, and use embodiments of the present invention wherein sub-imaging units 1002 are arranged in other one-dimensional arrangements and multi-dimensional arrangements, such as spherical arrangements, elliptical arrangements, and the like.

By arranging sub-imaging units 1002 to more closely match the image field of collector optic 1006, the present invention enables collector optic 1006 to have a simpler design than would be needed for a system wherein detector arrays 412 are coplanar. Further, the curved arrangement depicted mitigates field-curvature aberrations in the system.

Although system 1000 comprises lenslets 1008 that are located after image field 1004, it will be clear to one skilled in the art, after reading this specification, how to specify, make, and use alternative embodiments of the present invention wherein lenslets 1008 are located prior to image field 1004.

Figure 11:
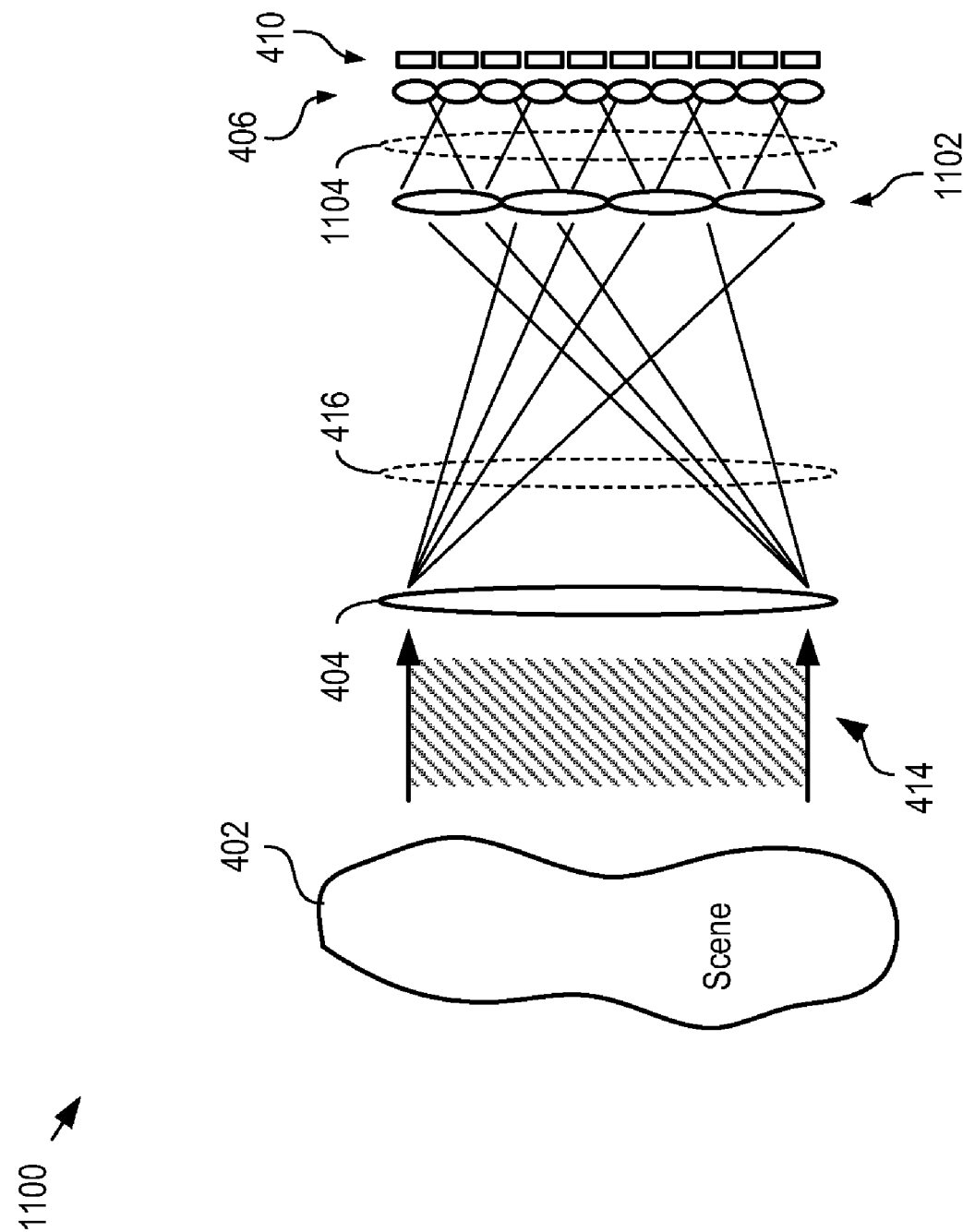
FIG. 11 depicts a schematic diagram of an imaging system in accordance with a second alternative embodiment of the present invention.

FIG. 11 depicts a schematic diagram of an imaging system in accordance with a second alternative embodiment of the present invention. System 1100 comprises collector optic 404, pre-processor optic 1100, processor optic 406, and aperture array 410.

System 1100 is a hierarchical imaging system that "steps down" optical field 414, in stages, from optical field 416 provided by collector optic 404 to optical fields 420 received by aperture array 410.

Pre-processor optic 1102 is analogous to processor optic 406. Pre-processor optic 1102 and processor optic 406 collectively enable a greater degree of aberration correction. As a result, system 1100 enables the use of larger aperture collector optics. Although the characteristics of system 1100 are a matter of design choice, an exemplary two-processor-stage arrangement includes: a collector optic comprising a collector lens having a diameter of approximately 1 meter; a pre-processor optic comprising a plurality of lenslets, each having a diameter of approximately 5 millimeters; and a processor optic comprising a plurality of lenslets, each having a diameter of approximately 1 millimeter. It will be clear to one skilled in the art, after reading this specification, how to specify, make, and use alternative embodiments of the present invention that comprise:

i. more than two processor stages; or
    ii. aberration correction is provided by only one of pre-processor optic 1102 and processor optic 406; or
    iii. a pre-processor optic comprising a plurality of lenslets wherein at least one lenslet has a diameter that is different from at least one other lenslet of the plurality; or
    iv. a pre-processor optic comprising a plurality of lenslets wherein at least one lenslet has a diameter that is different from at least one other lenslet of the plurality; or
    v. a collector optic, pre-processor optic, and/or processor optic having diameters different than 1 meter, 5 millimeters, and 1 millimeter, respectively; or
    vi. any combination of i, ii, iii, iv, and v.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
    receiving light from a scene at a collector optic, wherein the collector optic is characterized by an image field;
    providing a first optical field from the collector optic, wherein the first optical field is based on the light from the scene;
    receiving a first portion of the first optical field at a first optical element, wherein the first portion is characterized by a first localized aberration;
    providing a second optical field from the first optical element, wherein the second optical field is based on the first portion of the first optical field, and wherein the magnitude of the first localized aberration in the second optical field is less than the magnitude of the first localized aberration in the first portion of the first optical field;

receiving a second portion of the first optical field at a second optical element, wherein the second portion is characterized by a second localized aberration; and providing a third optical field from the second optical element, wherein the third optical field is based on the second portion of the first optical field, and wherein the magnitude of the second localized aberration in the third optical field is less than the magnitude of the second localized aberration in the second portion of the first optical field.

2. The method of claim 1 further comprising:

providing the first optical element as one of a plurality of optical elements, wherein the first optical element reduces the magnitude of the first localized aberration by an amount that is based on the position of the first optical element within the plurality of optical elements; and providing the second optical element as one of the plurality of optical elements, wherein the second optical element reduces the magnitude of the second localized aberration by an amount that is based on the position of the second optical element within the plurality of optical elements.

3. The method of claim 1 further comprising:

(1) forming a first sub-image, wherein the first sub-image is formed by operations comprising;

(i) receiving the second optical field at a first array of photodetectors;

(ii) generating a first plurality of electrical signals, wherein the first plurality of electrical signals are generated by the first array of photodetectors based on the second optical field;

(iii) providing the first plurality of electrical signals to a processor; and (iv) digitally processing the first plurality of electrical signals to form the first sub-image; and (2) forming a second sub-image, wherein the second sub-image is formed by operations comprising;

(i) receiving the third optical field at a second array of photodetectors;

(ii) generating a second plurality of electrical signals, wherein the second plurality of electrical signals are generated by the second array of photodetectors based on the third optical field;

(iii) providing the second plurality of electrical signals to the processor; and (iv) digitally processing the second plurality of electrical signals to form the second sub-image.

4. The method of claim 3 further comprising:

selecting the size of the first array of photodetectors, wherein the size of the first array of photodetectors is selected based upon the aperture size of the first optical element; and selecting the size of the second array of photodetectors, wherein the size of the second array of photodetectors is selected based upon the aperture size of the second optical element.

5. The method of claim 3 further comprising forming a first image, wherein the first image is spatially correlated with the scene, and wherein the first image comprises the first sub-image and the second sub-image.

6. The method of claim 3 further comprising arranging the first array of photodetectors and second array of photodetectors, wherein the first array of photodetectors defines a first plane and the second array of photodetectors defines a second plane, and wherein the first plane and second plane are different planes.

7. The method of claim 3 further comprising providing a plurality of photodetector arrays, wherein the plurality of photodetector arrays comprises the first array of photodetectors and second array of photodetectors, and wherein the plurality of photodetector arrays are arranged in an arrangement that substantially matches the shape of the image field of the collector optic.

8. The method of claim 1 further comprising providing the second optical field such that the magnitude of a third localized aberration in the second optical field is less than the magnitude of the third localized aberration in the first portion of the first optical field.

9. The method of claim 1 further comprising:

receiving the second optical field at a second optical element, wherein the second optical element tiles the second optical field into a first plurality of optical sub-fields, and wherein each of the first plurality of optical sub-fields is characterized by a third localized aberration;

providing a second plurality of optical sub-fields, wherein each of the plurality of second optical sub-fields is based on a different optical sub-field of the first plurality of optical sub-fields, and wherein the magnitude of the third localized aberration in each of the plurality of second optical sub-fields is less than the magnitude of the third localized aberration in its corresponding optical sub-field of the first plurality of optical sub-fields;

receiving the third optical field at a third optical element, wherein the third optical element tiles the third optical field into a third plurality of optical sub-fields, and wherein each of the third plurality of optical sub-fields is characterized by a fourth localized aberration; and providing a fourth plurality of optical sub-fields, wherein each of the plurality of fourth optical sub-fields is based on a different optical sub-field of the third plurality of optical sub-fields, and wherein the magnitude of the fourth localized aberration in each of the plurality of fourth optical sub-fields is less than the magnitude of the fourth localized aberration in its corresponding optical sub-field of the third plurality of optical sub-fields.

10. A method comprising:

tiling a first optical field into a plurality of second optical fields, wherein the first optical field is based on light from a scene;

providing a plurality of third optical fields, wherein each of the plurality of third optical fields is based on a different one of the plurality of second optical fields, and wherein the magnitude of a first localized aberration in each of the plurality of third optical fields is less than the magnitude of the first localized aberration in its corresponding second optical field; and forming a plurality of sub-images based on the plurality of third optical fields, wherein the plurality of sub-images and the plurality of third optical fields has a one-to-one correspondence.

11. The method of claim 10 further comprising combining the plurality of sub-images to form a first image of the scene, wherein the first image is spatially correlated with the scene.

12. The method of claim 10 wherein the plurality of sub-images is formed by operations comprising:

receiving a different one of the plurality of third optical fields at each of a plurality of photodetector arrays;

generating a plurality of output signal arrays, wherein each of the plurality of output signal arrays is based on the third optical field received by a different one of the plurality of photodetector arrays; and digitally processing each of the plurality of output signal arrays to form a different one of the plurality of sub-images.

13. The method of claim 12 further comprising:
providing the plurality of third optical fields to the plurality of photodetector arrays, wherein each of the third optical fields is provided by a different optical element of a plurality of optical elements; and
determining the size of each of the plurality of photodetector arrays based upon the aperture size of its corresponding optical element of the plurality of optical elements.

14. The method of claim 12 further comprising providing the plurality of photodetector arrays, wherein each of the plurality of photodetector arrays lies on a first plane.

15. The method of claim 12 further comprising providing the plurality of photodetector arrays in an arrangement wherein the photodetector arrays are not co-planar.

16. The method of claim 12 further comprising providing the plurality of photodetector arrays in an arrangement wherein the photodetector arrays are co-planar.

17. The method of claim 12 further comprising:
receiving the light from the scene at a collector optic, wherein the collector optic provides the first optical field to a processor optic, and wherein the collector optic is characterized by an image field;
providing the processor optic, wherein the processor optic tiles the first optical field, and wherein the processor optic comprises a plurality of optical elements;
providing the plurality of photodetector arrays, wherein the plurality of photodetector arrays and the plurality of optical elements collectively define a plurality of sub-imaging units, and wherein the plurality of sub-imaging units are provided in an arrangement that substantially matches the shape of the image field.

18. The method of claim 10 further comprising providing the plurality of third optical fields such that the magnitude of a second localized aberration in each of the plurality of third optical fields is less than the magnitude of the second localized aberration in its corresponding second optical field.

19. An apparatus comprising:
a collector optic, wherein the collector optic receives light from a scene and provides a first optical field that is based on the light, and wherein the collector optic is characterized by an image field; and
a processor optic comprising a plurality of optical elements, wherein each of the plurality of optical elements is dimensioned and arranged to reduce the magnitude of a first localized aberration;
wherein the processor optic tiles the first optical field into a plurality of second optical fields, and wherein each of the plurality of optical elements receives a different one of the plurality of second optical fields and provides a third optical field based on its received second optical field;
wherein the magnitude of the first localized aberration in each of the plurality of third optical fields is less than the magnitude of the first localized aberration in its corresponding second optical field.

20. The apparatus of claim 19 further comprising an aperture array, wherein the aperture array comprises a plurality of photodetector arrays, and wherein each of the plurality of photodetector arrays receives a different one of the plurality of third optical fields, and further wherein each of the plurality of photodetector arrays provides an electrical signal array that is based on its received third optical field.

21. The apparatus of claim 20 further comprising a processor, wherein the processor forms a plurality of sub-images, and wherein each of the plurality of sub-images is based on a different one of the plurality of electrical signal arrays.

22. The apparatus of claim 21 wherein the processor forms a first image based on the plurality of sub-images, and wherein the first image is spatially correlated with the scene.

23. The apparatus of claim 20 wherein the plurality of photodetector arrays are co-planar.

24. The apparatus of claim 20 wherein the plurality of photodetector arrays are monolithically integrated.

25. The apparatus of claim 20 wherein a first photodetector array of the plurality of photodetector arrays is located on a first plane, and wherein a second photodetector array of the plurality of photodetector arrays is located on a second plane, and wherein the first plane and second plane are different planes.

26. The apparatus of claim 20 wherein the plurality of photodetector arrays are arranged in an arrangement that substantially matches the shape of the image field.

27. The apparatus of claim 20 wherein each of the plurality of photodetector arrays and a different one of the plurality of optical elements collectively define a sub-imaging unit, and wherein the plurality of sub-imaging units are arranged in an arrangement based on the shape of the image field.

28. The apparatus of claim 19 further comprising an aperture array, wherein each aperture of the aperture array comprises a plurality of optical elements, and wherein each aperture of the aperture array receives a different one of the plurality of third optical fields, and further wherein each aperture of the aperture array tiles its received third optical field into a plurality of fourth optical fields.

29. The apparatus of claim 28 wherein each optical element is dimensioned and arranged to reduce the magnitude of the first localized aberration.

30. The apparatus of claim 19 wherein at least one of the plurality of optical elements is dimensioned and arranged to reduce the magnitude of a second localized aberration.

31. An apparatus comprising:
a collector optic, wherein the collector optic receives light from a scene and provides a first optical field that is based on the light, and wherein the collector optic is characterized by an image field;
a processor optic comprising a plurality of first optical elements, wherein the plurality of first optical elements is arranged in an arrangement that substantially matches the image field; and wherein each of the plurality of optical elements is dimensioned and arranged to reduce the magnitude of a first localized aberration; and
a plurality of photodetector arrays, wherein each of the plurality of photodetector arrays receives a portion of the first optical field from a different one of the plurality of first optical elements, and wherein each of the plurality of photodetector arrays provides a sub-image that is based on its received portion of the first optical field.

32. The apparatus of claim 31 wherein each of the plurality of optical elements is arranged as a relay lens between the image field and its optically coupled photodetector array.

33. The apparatus of claim 32 wherein each of the plurality of first optical elements further comprises a second optical element that is dimensioned and arranged to reduce the magnitude of a second localized aberration.

34. The apparatus of claim 31 further comprising a processor, wherein the processor forms a composite image that comprises the plurality of sub-images, and wherein the composite image is spatially correlated with the scene.

* * * * *

UNITED STATES PATENT AND TRADEMARK OFFICE
CERTIFICATE OF CORRECTION

| | | |
|---|---|---|
| PATENT NO. | : 8,259,212 B2 | Page 1 of 1 |
| APPLICATION NO. | : 12/651894 | |
| DATED | : September 4, 2012 | |
| INVENTOR(S) | : Brady et al. | |

It is certified that error appears in the above-identified patent and that said Letters Patent is hereby corrected as shown below:

Title Page
There is an error in the Assignee. It presently lists 1 Assignee: Applied Quantum Technologies, Inc., but both Assignees should be listed:

Applied Quantum Technologies, Inc.
Durham, NC and

Duke University
Durham, NC

Signed and Sealed this
Twenty-sixth Day of February, 2013

Teresa Stanek Rea
*Acting Director of the United States Patent and Trademark Office*